United States Patent [19]

Akiyama et al.

[11] Patent Number: 5,346,772
[45] Date of Patent: Sep. 13, 1994

[54] ORGANIC ELECTROLUMINESCENCE DEVICE

[75] Inventors: Shuzo Akiyama; Kenichiro Nakashima, both of Nagasaki; Kunio Imai, Tsurugashima; Ryuji Murayama, Tsurugashima; Jun Funaki, Tsurugashima, all of Japan

[73] Assignee: Pioneer Electronic Corporation, Tokyo, Japan

[21] Appl. No.: 53,648

[22] Filed: Apr. 27, 1993

[30] Foreign Application Priority Data

Aug. 14, 1992 [JP] Japan .................. 4-216876

[51] Int. Cl.⁵ .............................. B32B 9/00
[52] U.S. Cl. ......................... 428/457; 428/690;
428/917; 313/504; 252/301.16
[58] Field of Search .......... 514/255, 256; 313/501,
313/502, 503, 504; 252/301.16, 301.17, 301.19,
301.21, 301.22, 301.23, 301.35, 301.26; 428/690,
457, 917

[56] References Cited

U.S. PATENT DOCUMENTS 5,153,073 10/1992 Ohnuma et al. .................. 428/917
5,256,945 10/1993 Imai et al. ........................ 313/504

FOREIGN PATENT DOCUMENTS 020023 3/1972 Japan .............................. 544/256

OTHER PUBLICATIONS

Nakashima et al., "Synthesis of Pyrimido [5,4-d] Pyrimidine Derivatives and Their UV Absorption and Fluorescence Spectral Properties," Dyes and Pigments, 12 (1990) 21-26.

Primary Examiner—Patrick J. Ryan
Assistant Examiner—Patrick R. Jewik
Attorney, Agent, or Firm—Foley & Lardner

[57] ABSTRACT

An organic electroluminescent device comprises an anode, a positive-hole transport layer of organic compound, an emitting layer of organic compound, and a cathode which are laminated in sequence, wherein the emitting layer comprises a pyrimidopyrimidine derivative. This device emits with a high luminance and high emission efficiency.

18 Claims, 6 Drawing Sheets emission emission

ORGANIC ELECTROLUMINESCENCE DEVICE

BACKGROUND OF THE INVENTION

1. Field of the invention

The present invention relates to an electroluminescence (EL) device having an emitting layer made of an emitting substance, which utilizes an electroluminescence phenomenon that is the emission of light resulting from application of an electric field to the substance. More particularly, it is concerned with an organic EL device in which the emitting layer is made of an organic luminous substance.

2. Description of the prior art

As organic EL devices, there have been known a device of two-layer structure type having two layers made of organic compounds respectively as shown in FIG. 1, in which an organic fluorescent thin film 3 (hereinafter referred as "emitting layer") and an organic positive-hole transport layer 4 are laminated with each other and are arranged between a metal cathode 1 and a transparent anode 2. There have been also known a device of three layer structure type having three layers made of organic compounds respectively as shown in FIG. 2, in which an organic electron transport layer 5, an emitting layer 3 and an organic hole transport layer 4 are laminated in sequence and are sandwiched as a whole between a metal cathode 1 and a transparent anode 2. The hole transport layer 4 facilitates the infusion of the holes from the anode and blocks electrons. The electron transport layer 5 facilitates the infusion of electrons from the cathode.

In these organic EL devices, a glass substrate 6 is furnished outside the transparent anode 2. The recombination of electrons injected from the metal cathode 1 and the holes injected from the transparent anode 2 to the emitting layer 3 generates excitons. The excitons emit light when they are deactivated through radiation. This light radiates toward outside through the transparent anode 2 and the glass substrate 6.

There have been also known an organic EL device comprising an emitting layer formed of the mixture of an organic fluorescent guest material and an organic host material having a large capability of transporting electrons to stably emit light.

As aforementioned organic EL devices can emit light even by application of a lower voltage, it is firmly expected to develop an EL device capable of emission at a further higher luminance efficiency.

SUMMARY OF THE INVENTION

An object of the present invention is to provide an organic EL device capable of stably emitting light at a high luminance and a high efficiency to satisfy the above mentioned expectation.

An organic EL device according to the present invention comprises an anode, a positive-hole transport layer of organic compound, an emitting layer of organic compound, and a cathode which are laminated in sequence, wherein said emitting layer comprises a pyrimidopyrimidine derivative represented by formula 1

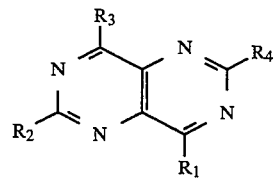

where substituents $R_1$–$R_4$ are independently hydrogen atom, halogen atom and functional groups represented by formula 2

where $R_5$ and $R_6$ are independently hydrogen atom, alkyl group, aryl group, or $R_5$ and $R_6$ taken together comprises the atoms or groups necessary to complete a cycloalkyl or heterocyclic ring.

According to the present invention, there is obtained an organic EL device capable of stably emitting light at a high luminance and a high efficiency with a high color purity.

BRIEF DESCRIPTION OF THE DRAWINGS

FIGS. 4A–12A are graphs representing the EL spectrum characteristics of the EL devices of Examples 1–9; and FIGS. 4B–12B are graphs representing the PL spectrum characteristics of pyrimidopyrimidine derivatives used in the EL devices of examples 1–9.

DETAILED DESCRIPTION OF PREFERRED EMBODIMENTS

The embodiments according to the present invention will be described in more detail with reference to the accompanying drawings.

Figure 2:
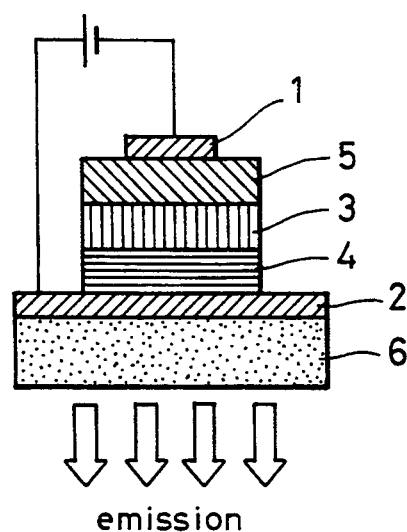
FIG. 2 is a schematic diagram showing an organic EL device with tree-layer structure.

The EL device in accordance with the present invention is similar to the organic EL device of the structure shown in FIG. 2. Such an EL device has the three-layer structure formed by layering an organic electron transport layer 5, the organic fluorescent film 3 and the organic positive-hole transport layer 4 in sequence between a pair of the metal cathode 1 and the transparent anode 2. In this structure of the EL device, at least one of the electrodes 1 and 2 may be transparent. The cathode 1 is formed of a metal with a lower work function such as aluminum, magnesium, indium, silver or alloys of the individual metals thereof in the thickness range of from about 100 to 5000 angstroms. The transparent anode 2 is formed of an electric conductive material with a higher work function such as indium-tin oxide (ITO) in the thickness range of from about 1000 to 3000 angstroms. Alternatively, the transparent anode 2 may be formed of gold with the thickness of from about 800 to 1500 angstroms. The electrode of gold thin film is semitransparent.

The emitting layer 3 comprises a pyrimidopyrimidine derivative having Pyrimido[5,4-d]pyrimidine skeleton represented by formula 1

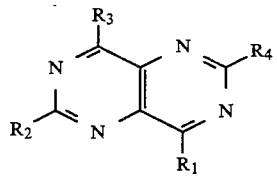 (1)

where substituents $R_1$–$R_4$ of the pyrimidopyrimidine derivative of formula 1 are independently hydrogen atom, halogen atom and the functional amine groups denoted by formula 2

 (2)

where $R_5$ and $R_6$ in formula 2 of the pyrimidopyrimidine derivative of formula 1 are independently hydrogen atom, alkyl group, aryl group, or $R_5$ and $R_6$ taken together comprises the atoms or groups necessary to complete a cycloalkyl or heterocyclic ring.

For example, the substituents $R_1$–$R_4$ are optionally independently selected from hydrogen atom, and halogen atoms such as fluorine, chlorine and bromine, diethanolamino group, ethanolamino group, piperidino group, p-methoxyanilino group, m-methoxyanilino group, morpholino group, anilino group, benzylamino group, diphenylamino group, pyrrolidino group, thiazolidino group and thiomorpholino group.

The hetero atoms in the heterocyclic ring constructed by $R_5$ and $R_6$ taken together in formula 2 of the pyrimidopyrimidine derivative of formula 1 are nitrogen, oxygen, sulfur.

In addition, the portions of alkyl group, alkylene group, aryl group and arylene group in the cycloalkyl or heterocyclic ring constructed by R5 and R6 taken together in formula 2 may be substituted by substituent groups such as alkyl group, alkoxy group, aryl group, aryloxy group and halogen atoms such as fluorine, chlorine and bromine.

Furthermore, the symmetrical pyrimidopyrimidine derivative is preferably used and represented by formula

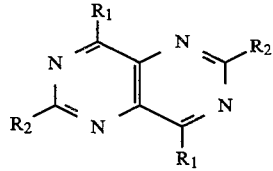 (3)

where $R_1$ and $R_2$ are different from each other and independently hydrogen atom, halogen atom, or the functional groups of formula 2 above defined. The homogeneous pyrimidopyrimidine derivative is also preferably used and represented by formula 4

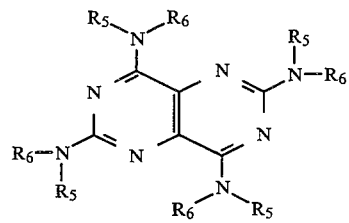 (4)

wherein $R_5$ and $R_6$ are independently hydrogen atom, alkyl group, aryl group, or $R_5$ and $R_6$ taken together comprises the atoms or groups necessary to complete a cycloalkyl or heterocyclic ring.

There is the so called Dipyridamole as used for a reagent of fluorescent analysis as one of the pyrimidopyrimidine derivatives. Dipyridamole may be used for the emitting layer 3 of the organic EL device. Dipyridamole that is 2,6-bis(diethanolamino)-4,8-dipiperidino pyrimido[5,4-d]pyrimidine is represent by formula 5.

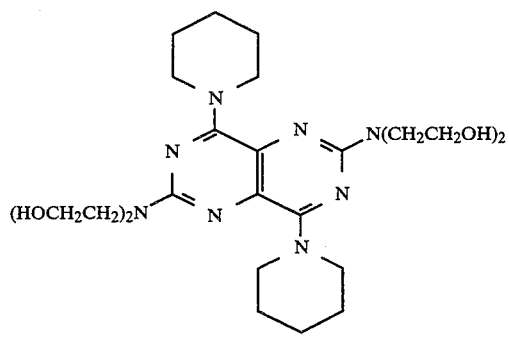 (5)

Dipyridamole has diethanolamino groups at 2,6-positions and piperidino groups at 4,8-positions in the pyrimido[5,4-d]pyrimidine skeleton as shown in formulas 3 and 4 in the structure.

Other preferred pyrimidopyrimidine derivatives are for example, 2,4,8-tri(p-methoxyanilino) pyrimido[5,4-d]pyrimidine represented by formula 6,

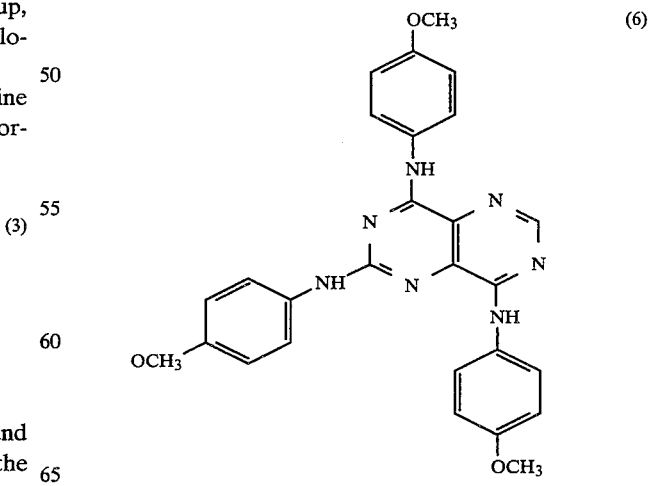 (6)

2,4,6,8-tetramorpholino pyrimido[5,4-d]pyrimidine represented by formula 7,

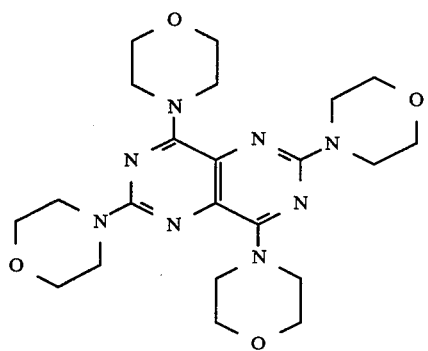

2,4,6,8-tetraanilino pyrimido[5,4-d]pyrimidine represented by formula 8,

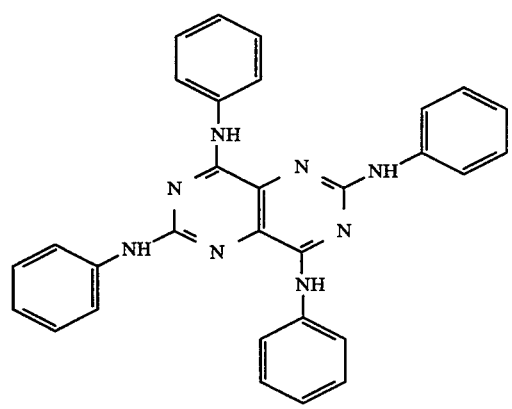

2,4,6,8-tetra(p-methoxyanilino) pyrimido[5,4-d]pyrimidine represented by formula 9,

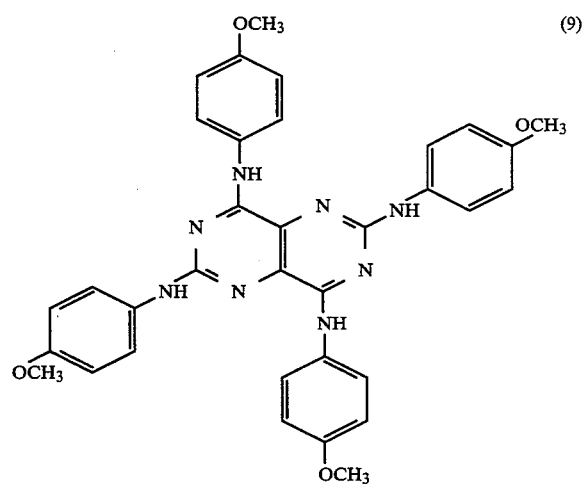

2,4,6,8-tetrabenzylamino pyrimido[5,4-d]pyrimidine represented by formula 10,

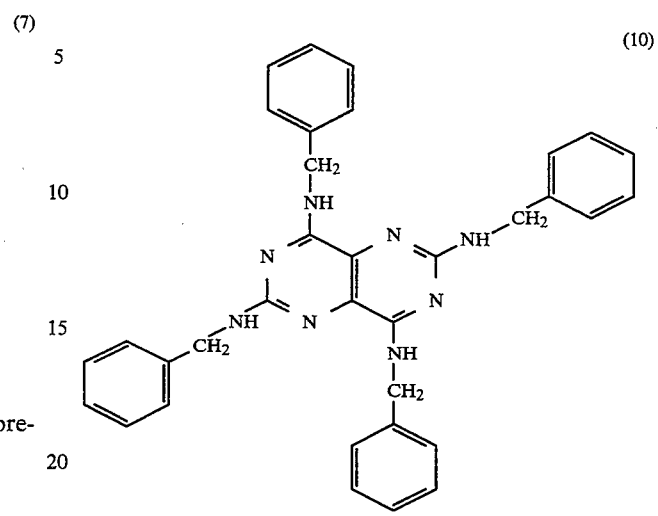

2,4,8-trimorpholino pyrimido[5,4-d]pyrimidine represented by formula 11,

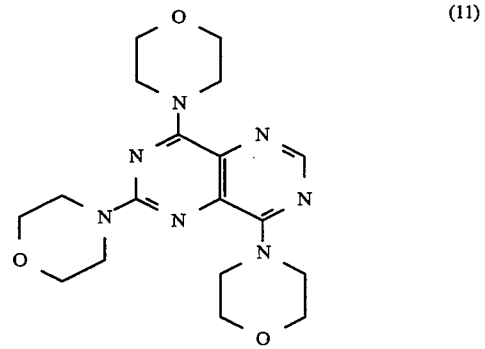

2,4,8-tripyrrolidino pyrimido[5,4-d]pyrimidine represented by formula 12,

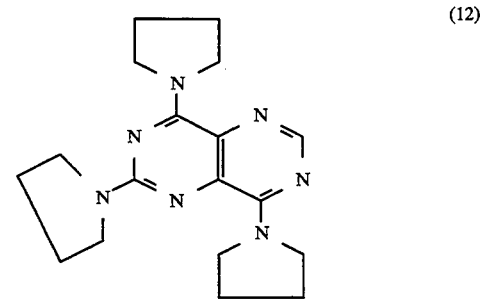

2,4,6,8-tetrapiperidino pyrimido[5,4-d]pyrimidine represented by formula 13,

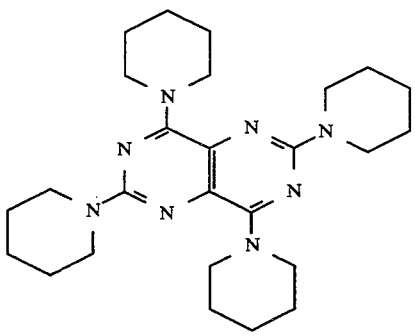

2,4,6,8-tetrathiomorpholino pyrimido[5,4-d]pyrimidine represented by formula 14.

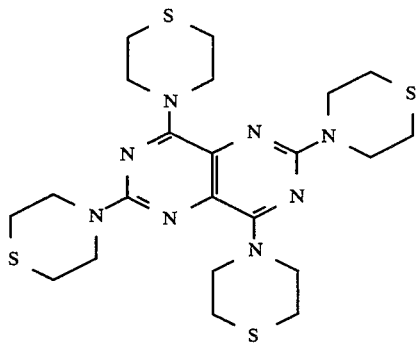

The emitting layer 3 may be made of only the pyrimidopyrimidine derivative in the form of the two-layer or three-layer structure of the organic EL device.

In addition, the emitting layer 3 may be made of the mixture of the pyrimidopyrimidine derivative at a little content as a fluorescent guest material together with an organic host material having a large capability of transporting electrons. For example, there are 2-(4'-tert-Butylphenyl)-5-(biphenyl)-1,3,4-oxadiazole (t-Bu-PBD) hereinafter mentioned in the host material of the emitting layer 3. Further, the emitting layer 3 of the organic EL device preferably may include a quinoline derivative as a host material such as tris(8-quinolinol-)aluminum (hereinafter referred as "Al$_{q3}$") represented by the following structure of formula 15.

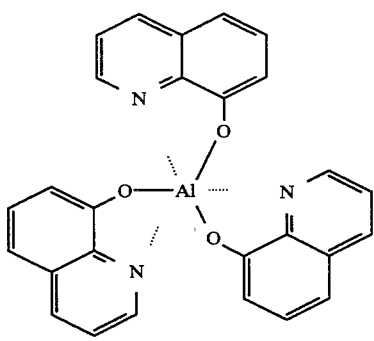

Other host materials of quinoline derivatives preferably used in the fluorescent emitting layer are, for example, bis(8-quinolinol) magnesium, bis(benzo{f}-8-quinolinol)zinc, bis(2-methyl-8-quinolinolate)aluminum oxide, tris(8-quinolinol)indium, tris(5-methyl-8-quinolinol)aluminum, 8-quinolinol lithium, tris(5-chloro-8-quinolinol)gallium, bis(5-chloro-8-quinolinol)-calcium, and poly[zinc(II)-bis(8-hydroxy-5-quinolinyl)methane].

In this case that the pyrimidopyrimidine derivative is used for a guest material in the emitting layer, it is preferred that the atomic ratio of the host material is larger than that of the guest material. For example, the pyrimidopyrimidine derivative is contained at a concentration 1 wt % or lower or a atomic ratio 1% or low in the fluorescent emitting layer comprising t-Bu-PBD of the host material, because the emission with a high luminance of the EL device can be obtained at a low applied voltage.

Next, it is preferable that the hole transport layer is made of N, N'-diphenyl-N-N'-bis(3-methylphenyl)-1,'-biphenyl-4,4'-diamine (hereinafter referred as "TPD") represented by the following chemical formula 16. Further, the compounds known as CTM (carrier transporting materials) represented by the following formulas 17 to 27 are suitably used alone or as mixture for the first hole transport layer.

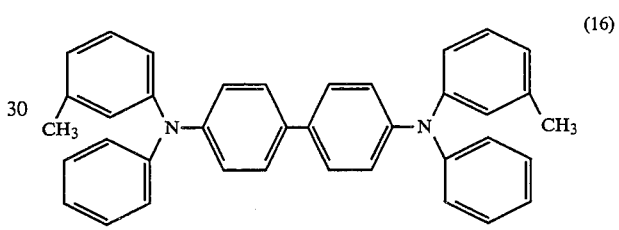

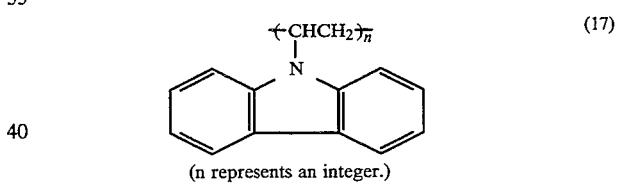

(n represents an integer.)

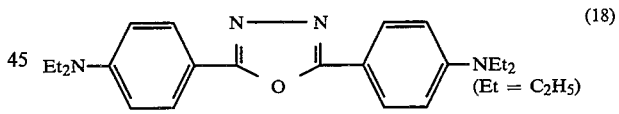

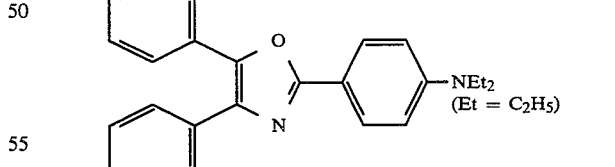

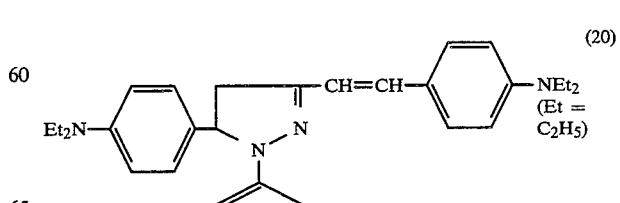

-continued

(21) 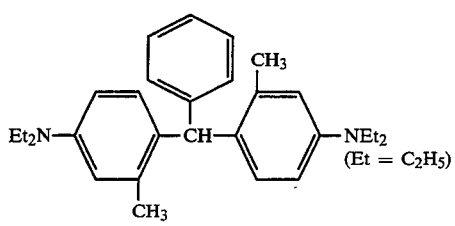

(22) 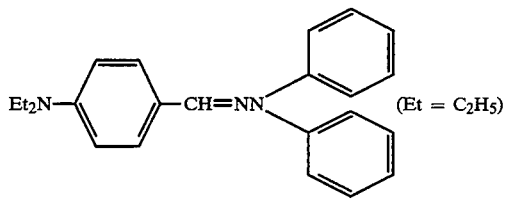

(23) 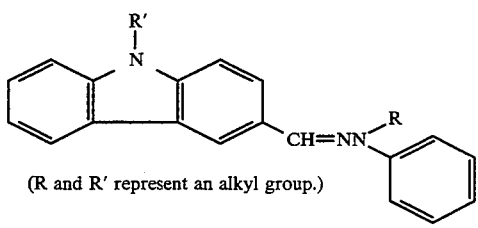
(R and R' represent an alkyl group.)

(24) 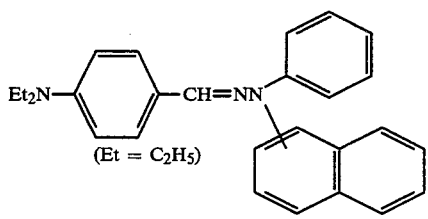
(Et = C₂H₅)

(25) 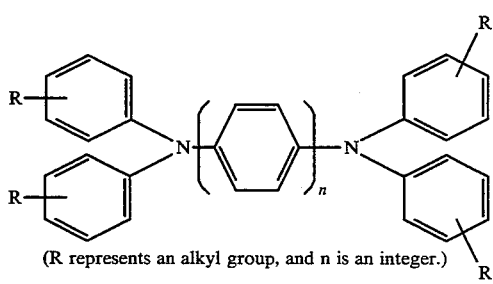
(R represents an alkyl group, and n is an integer.)

(26) 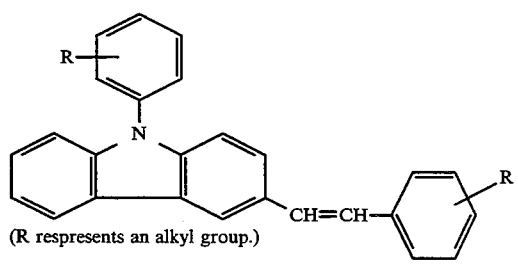
(R respresents an alkyl group.)

(27) 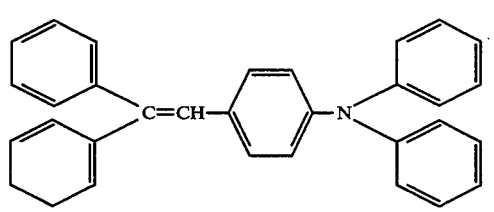

Figure 1:
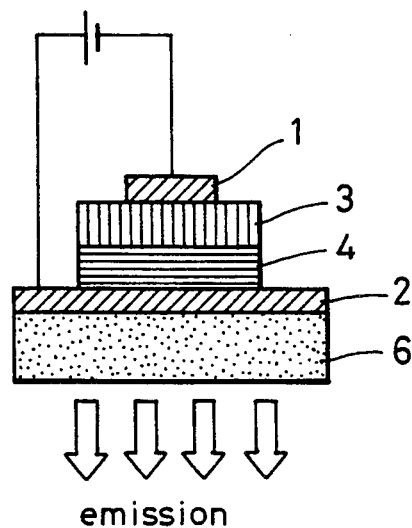
FIG. 1 is a schematic diagram showing an organic EL device with two-layer structure.

In this way, the preferred embodiments are the EL devices formed in the form of the two-layer structure in which the fluorescent emission layer 3 and the positive-hole transport layer 4 are arranged between a pair of the metal cathode 1 and the transparent anode 2 as shown FIG. 1.

Furthermore, the three-layer type EL device further comprising the electron transport layer 5 as shown FIG. 2, has also the same advantageous effect as the two-layer type EL device above mentioned. In this case, the electron transport layer 5 of the organic EL device is preferably made of the material having a large capability of transporting electrons such as 2-(4'-tert-butylphenyl)-5-(biphenyl)-1,3,4-oxadiazole (t-Bu-PBD) represented by the following chemical formula 28, and quinoline derivatives, Alq₃. A perylene tetracarboxyl derivative represented by the following formula 29 is also preferably used for the electron transport layer 5. Preferred examples of suitable organic compounds which may be employed as the electron transport layer 5 are represented by the following formulas 29 to 39.

(28) 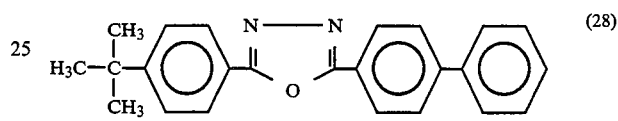

(29) 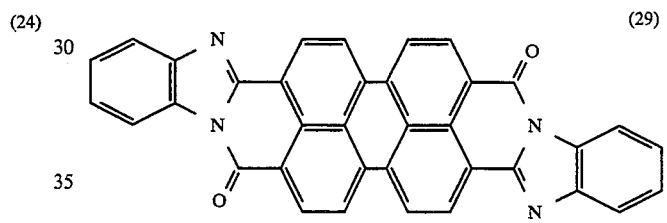

(30) 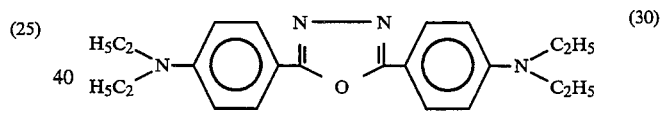

(31) 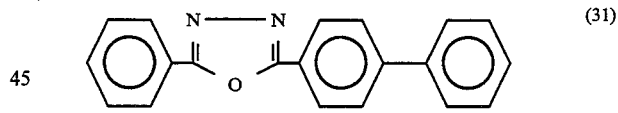

(32) 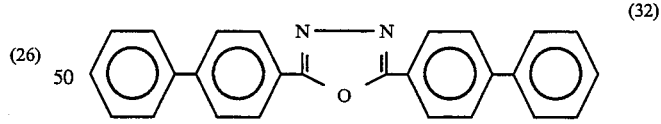

(33) 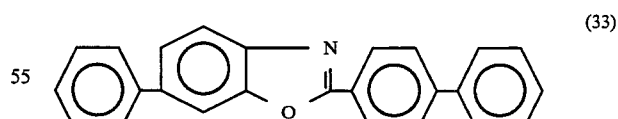

(34) 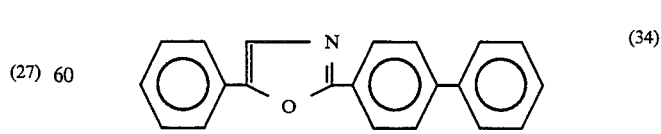

(35) 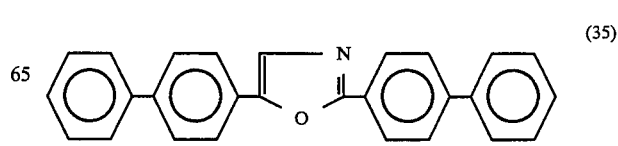

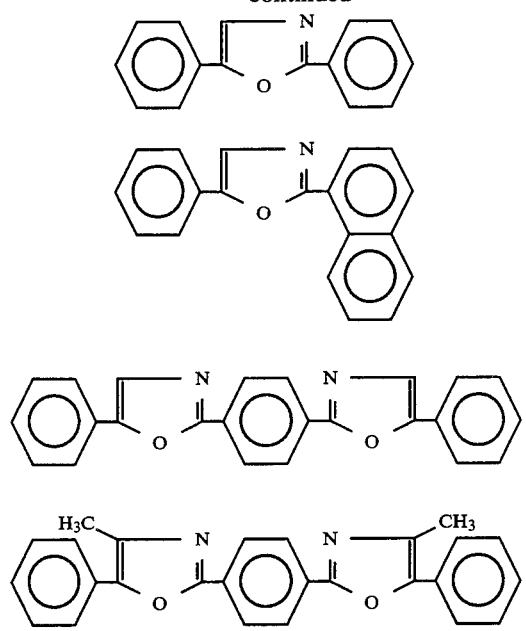

Inventors have concretely prepared EL devices comprising emitting layers including pyrimidopyrimidine derivatives such as dipyridamole.

EXAMPLE 1

EL device having the emitting layer including Dipyridamole of a guest material

A glass substrate on which anode strips (2 mm width) of ITO had been formed, was prepared. The substrate was washed by ultrasonic wave for 5 minutes in the mixture of isopropyl alcohol and water (1:1, volume ratio) and rinsed in ethyl alcohol. After the substrate was dried in the toluene vapor and it was left in the oven at temperature 75° C. for 20 minutes.

TPD denoted by formula 16 was deposited on the ITO anode on the dried substrate to be a hole transport layer with the thickness of 500 Å by using a tantalum boat carrying TPD.

Next, the mixture of t-Bu-PBD of formula 28 and dipyridamole formula 5was deposited on the TPD transport layer to be an emitting layer with 500 Å thickness by using the two-source evaporation method. In this case, t-Bu-PBD and dipyridamole were co-deposited while be monitored and controlled with respect to the deposition rates thereof so that the deposition rates were 500 Å/sec. of the t-Bu-PBD and 10 Å/sec. of dipyridamole.

Then, magnesium Mg and aluminum Al were vacuum co-deposited on the emitting layer through the shadow mask of 0.2 cm×3 cm to be a cathode with the thickness of 2500 Å (atomic ratio of Mg:Ag=10:1). In this way, there was obtained a two-layer type EL device having the emitting layer including Dipyridamole of the guest material and t-Bu-PBD of the host material as shown FIG. 1.

Figure 3:
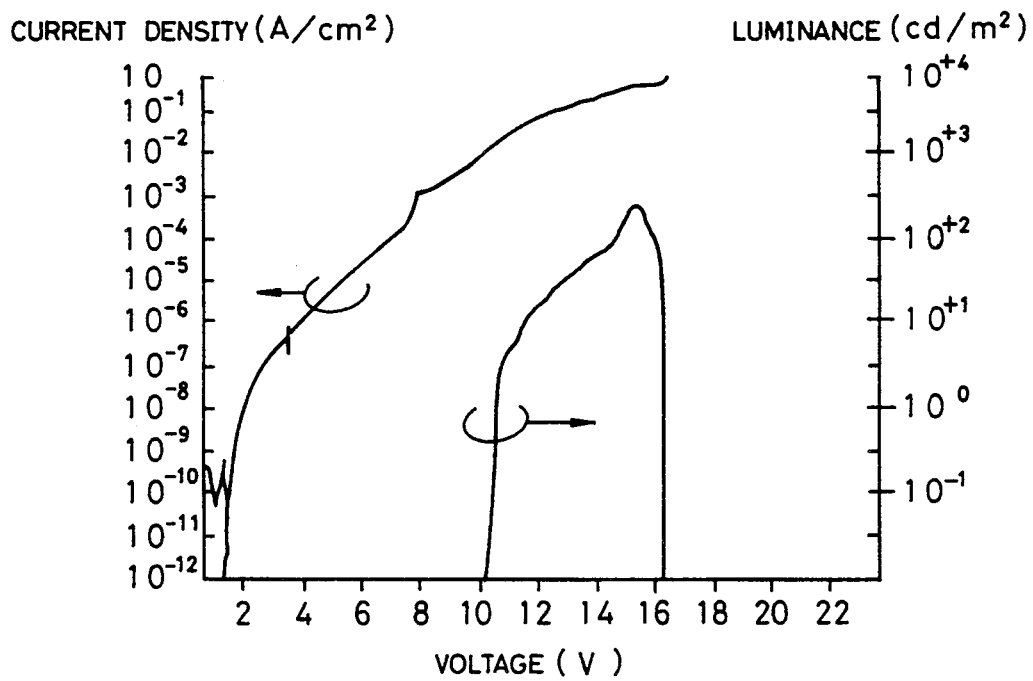
FIG. 3 is a graph showing changes of current and luminance with respect to voltage applied to the EL device of Example 1.

The resultant EL device was measured with respect to the current-voltage and luminance of response characteristic (I-V-L property). After the ITO electrode was connected to the positive voltage and the Mg—Al electrode was connected through an ammeter to the ground, the predetermined voltage was applied on the circuit. The emission light of the EL device was measured by a photometer. As shown in FIG. 3, the emission of the device was started at about 6 V applied and then the emission was reached to 219 cd/m$^2$ and 0.0139 lm/W at 15 V applied. The EL device was destroyed at about 16 V.

Figure 4A:
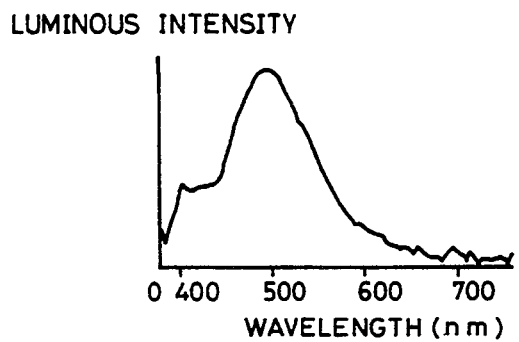
Figure 4B:
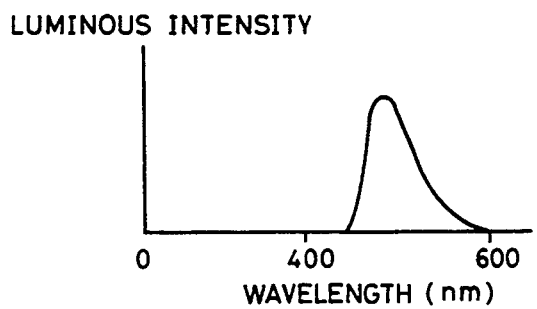

The EL device was measured with respect to the emission spectrum. FIG. 4A shows a spectral distribution of an electroluminescence (EL) of the EL device by the photometer. Further, FIG. 4B shows a spectral distribution of a photoluminescence (PL) of dipyridamole in Dioxane solution by the photometer. Since the EL spectrum distribution and its peak wavelength of the resultant EL device coincide with the PL spectrum distribution and its peak wavelength of dipyridamole in dioxane solution, it was confirmed that dipyridamole emitted in the emitting layer of the EL device.

EXAMPLES 2-9

EL devices having the emitting layers including various pyrimidomyrimidine derivatives of guest materials respectively Examples 2-9 of EL devices were assembled by the same procedure as described in Example 1, except that the electron transport layers included pyrimidopyrimidine derivatives of guest materials represented by formulas 6-13 respectively instead of dipyridamole used in Example 1. Namely, the TPD hole transport layer, the emitting layer comprising t-Bu-PBD and the guest material and Mg—Al electrode were laminated on the glass substrate with ITO strips. These examples showed the emission properties as Table 1 its head indicating luminance (L), emission efficiency ($\eta$), and current concentration (I).

TABLE 1

| EL device | L(cd/m$^2$) | $\eta$ (lm/W) | I(A/cm$^2$) |
|---|---|---|---|
| Example 2 | 23 | 0.0103 | 0.070 |
| Example 3 | 130 | 0.0548 | 0.039 |
| Example 4 | 41 | 0.0158 | 0.047 |
| Example 5 | 31 | 0.0643 | 0.0058 |
| Example 6 | 13 | 0.00263 | 0.1033 |
| Example 7 | 110 | 0.0193 | 0.0813 |
| Example 8 | 149 | 0.0124 | 0.2782 |
| Example 9 | 54 | 0.0392 | 0.0221 |

Figure 5A:
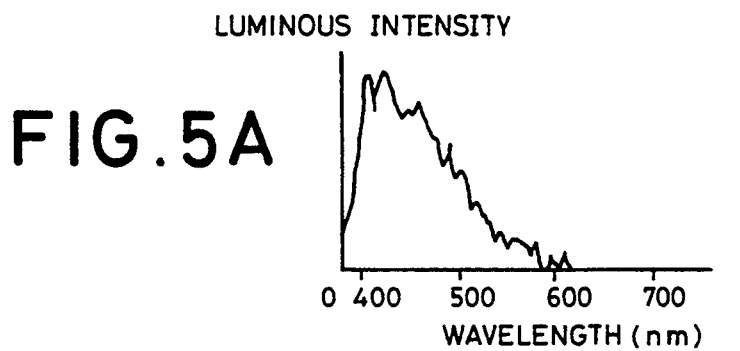
Figure 5B:
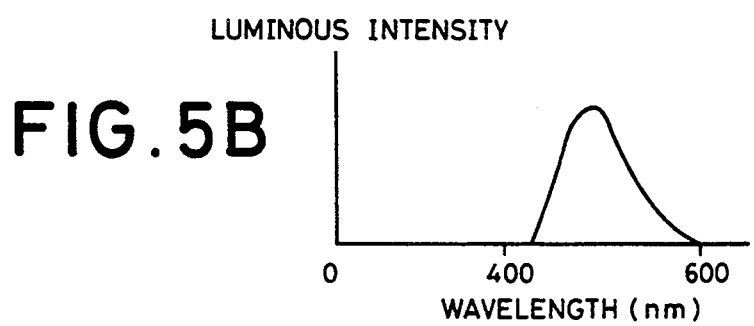
Figure 6A:
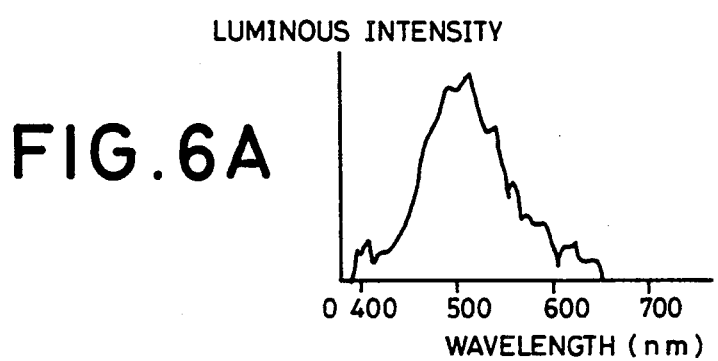
Figure 6B:
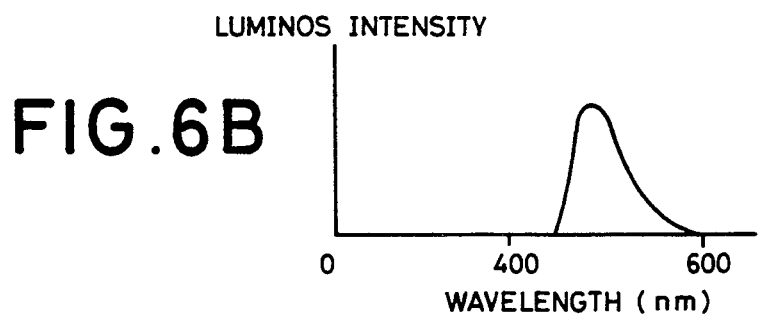
Figure 7A:
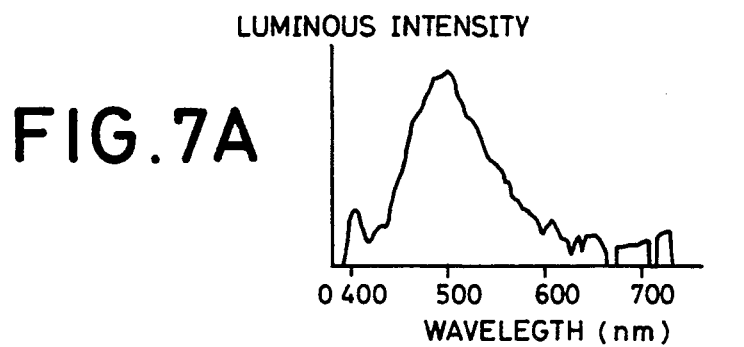
Figure 7B:
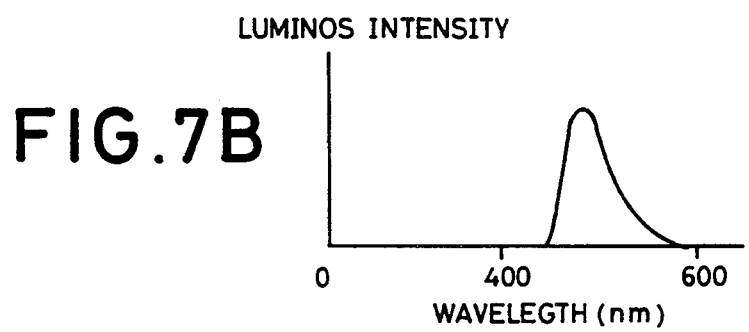
Figure 8A:
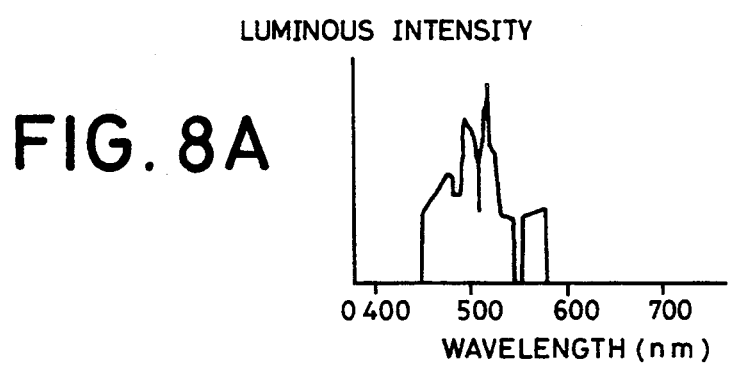
Figure 8B:
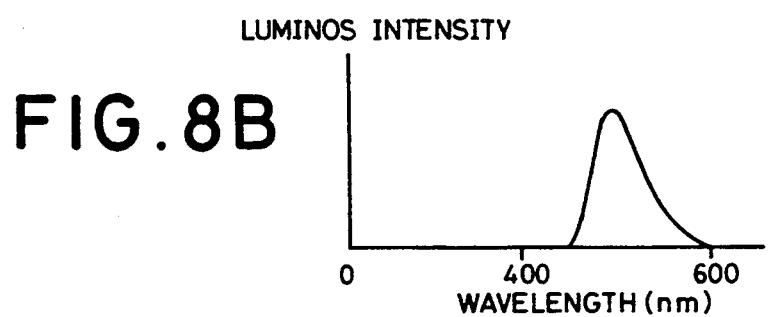
Figure 9A:
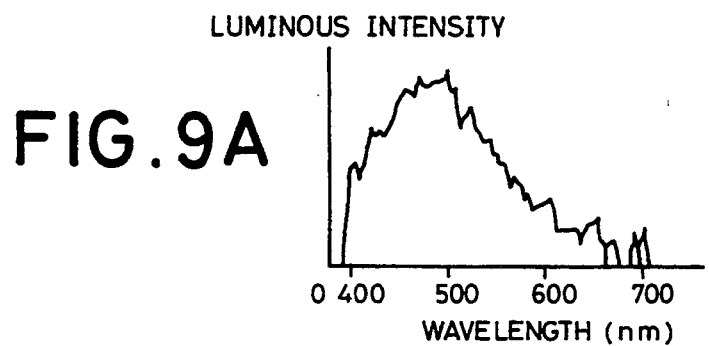
Figure 9B:
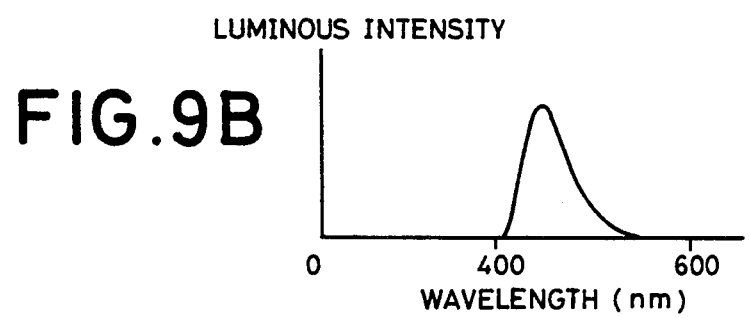
Figure 10A:
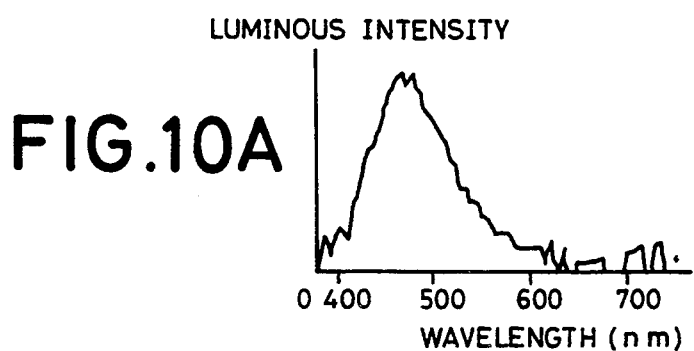
Figure 10B:
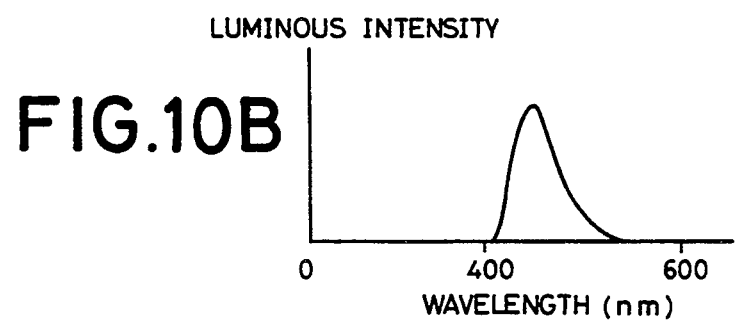
Figure 11A:
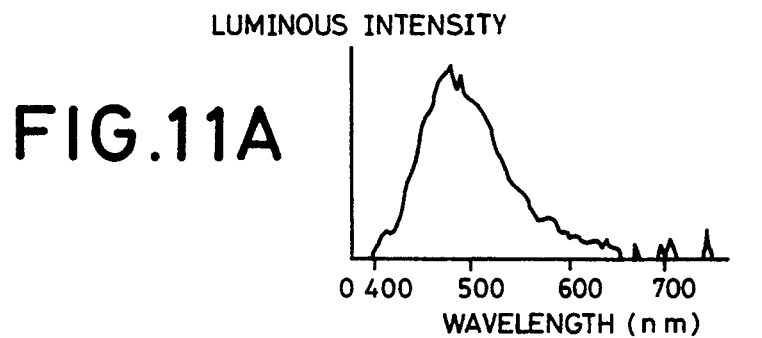
Figure 11B:
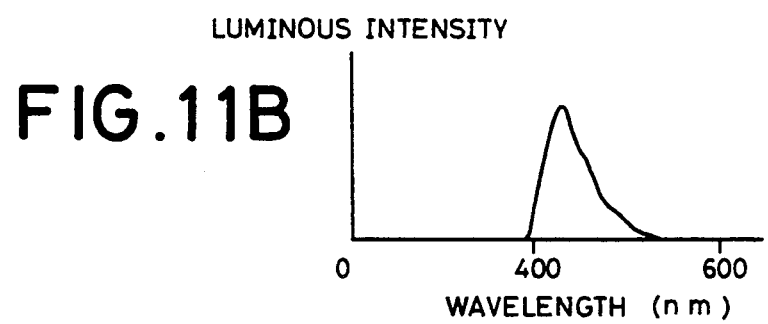
Figure 12A:
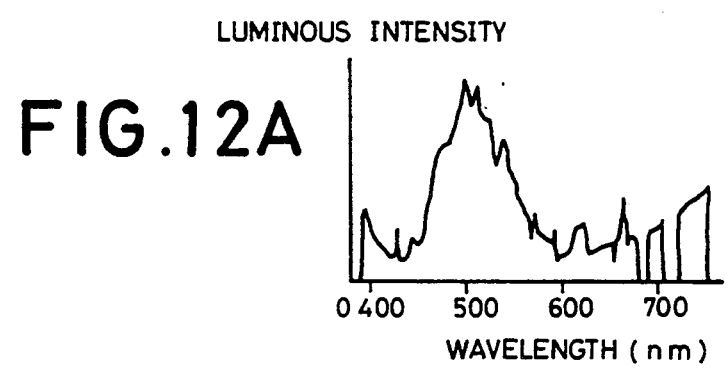
Figure 12B:
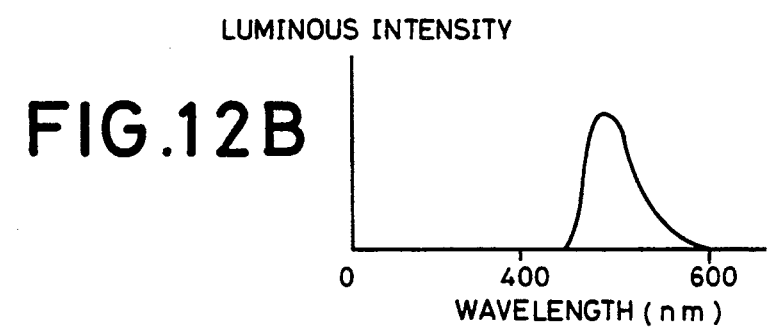

In addition, EL spectrum distributions of examples 2-9 of the organic EL devices are shown in FIGS. 5A-2A. FIGS. 5B-12B shows spectral distributions of a photoluminescence (PL) of pyrimidopyrimidine derivatives of guest materials denoted by formulas 6-13 in Dioxane solution.

Since the EL spectrum distributions of the EL devices are coincident with or similar to the PL spectrum distributions of the guest materials in dioxane solutions respectively, it is confirmed that these pyrimidopyrimidine derivatives emit in the emitting layers of the EL devices.

EXAMPLE 10

EL device having the emitting layer made of only Dipyridamole

After a TPD layer with the thickness of 500 Å was deposited on a glass substrate with ITO electrodes in the same manner of Example 1, dipyridamole was deposited on the TPD transport layer to be an emitting layer with 500 Å thickness and then, Mg—Al electrode layer was deposited with a thickness of 2000 Å as similar to Example 1.

The resultant EL device was measured with respect to the I-V-L property in the same manner as Example 1 and emitted bluish light at about 15 V applied.

EXAMPLE 11

EL device having the emitting layer including pyrimidopyrimidine derivative denoted by formula 40 of a guest material For further preparations of preferred Examples, the following substances denoted by formula 40-44 were synthesized in the scope of the pyrimidopyrimidine derivative defined by formula 1, i.e., 2,6-dimorphorino-4,8-dipiperidino pyrimido[5,4-d]pyrimidine represented by formula 40,

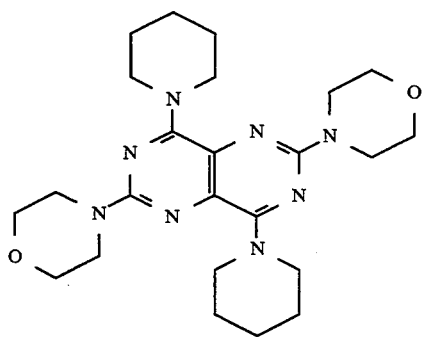

2,6-bis(hydroxyethyl-methyl-amino)-4,8-dipiperidino pyrimido[5,4-d]pyrimidine represented by formula 41,

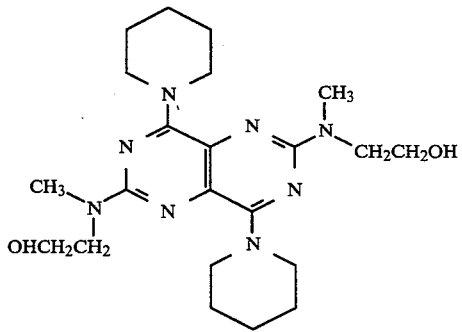

2,6-bis(hydroxyethyl-methyl-amino)-4,8-dithiomorphorino pyrimido[5,4-d]pyrimidine represented by formula 42,

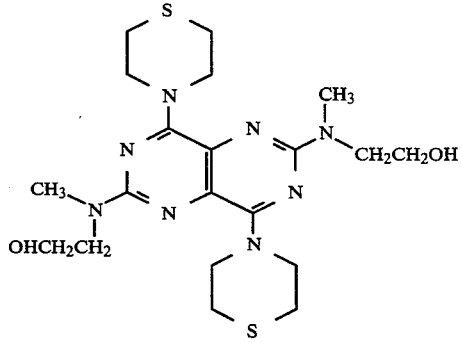

2,6-bis(hydroxyethyl-methyl-amino)-4,8-dimorphorino pyrimido[5,4-d]pyrimidine represented by formula 43,

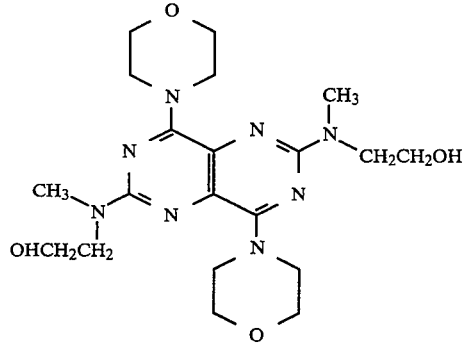

2,6-bis(hydroxyethyl-methyl-amino)-4,8-dipyrrolidinyl pyrimido[5,4-d]pyrimidine represented by formula 44,

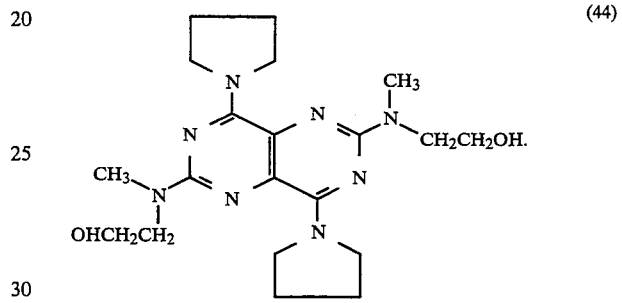

Six EL devices were assembled in each of which, on glass substrate with ITO electrode with 1000 Å thickness, a TPD transport layer with the thickness of 500 Å, an emitting layer made of the mixture of t-Bu-PBD and pyrimidopyrimidine derivative denoted by formula 40 with 600 Å thickness, and a Mg—Al electrode layer with 900 Å thickness were laminated in sequence under the conditions of Example 1, while their concentrations of pyrimidopyrimidine derivative of formula 40 were changed in such a manner that the deposition rate of t-Bu-PBD were commonly kept constant at 600 Å/sec. and those of the pyrimidopyrimidine derivative of formula 40 were changed from 1.5 Å/sec. to 52 Å/sec. as shown in Table 2. The EL devices were measured with respect to the emission characteristics. Table 2 shows the I-V-L properties of the EL devices resulted from the measurement and indicates at its head line concentration of pyrimidopyrimidine derivative (C), luminance (L), emission efficiency ($\eta$), and voltage (V).

TABLE 2

| C(Å/sec.) | $\eta$ (lm/W)* | L(cd/m$^2$)** | V(V)** |
|---|---|---|---|
| 1.5 | 0.26 | 17.05 | 13.18 |
| 3 | 0.21 | 19.10 | 11.62 |
| 3.75 | 0.18 | 16.70 | 14.39 |
| 4.5 | 0.22 | 26.73 | 13.44 |
| 35 | 0.21 | 38.90 | 7.16 |
| 52 | 0.26 | 62.38 | 9.35 |

*$10^{-3}$ A/cm$^2$
**$10^{-3}$ A/4 mm$^2$

As apparent from Table 2, although the spectrum distribution was changed in response to the concentration of the guest material, the luminance of the EL device increased and its emission efficiency was nearly kept constant. In other words, the probability of recombination between the electron and positive-hole increases in response to the concentration of the guest material and then this condition raises the luminance of the device in the constant current applied, although the number of the injected electrons and positive-holes are not influenced by the concentration of the guest material.

Next, the measurement of the emission spectrum was conducted with respect to the resultant EL device in such a manner that the spectrum distribution of the light emitted from the EL device was measured by the photometer. When the concentration of the guest material was low at 1.5 Å/sec., a second peak of wavelength 470 nm appeared in the shoulder of the main peak of wavelength 400 nm in the spectrum distribution. In other words, it is understood that the higher the concentration of the guest material rises, the height of the main peak of wavelength 400 nm becomes lower and simultaneously the height of the second peak of wavelength 470 nm becomes higher and grows a new main peak while the hue of emission changes from bluish purple to greenish blue.

EXAMPLES 12-15

Other EL devices having the emitting layers including various pyrimidopyrimidine derivatives of guest materials respectively Examples 12-15 of EL devices were assembled by the same procedure as described in Example 11, except that the electron transport layers included pyrimidopyrimidine derivatives of guest materials represented by formulas 41-44 respectively, in each of which the hole transport layer made of TPD, the emitting layer comprising t-Bu-PBD and the guest material and Mg—Al electrode were laminated in sequence on the glass substrate with ITO strips. These examples 12-15 corresponding to formulas 41-44 together with Example 11 were measured in their luminous characteristics respectively. As results, the emission properties were obtained as shown in Table 3 its head indicating concentration (C) for the guest materials of formulas 40-44, emission efficiency ($\eta$), current-luminance characteristic (I-L).

TABLE 3

| EL device | C(Å/sec.) | $\eta$ (lm/W) | I-L |
|---|---|---|---|
| Example 11 | 52 | 0.25 | logL = 1.05 · logI + 173 × 10$^{-6}$ |
| Example 12 | 40 | 0.13 | logL = 0.89 · logI + 178 × 10$^{-6}$ |
| Example 13 | 35 | 0.11 | logL = 0.91 · logI + 272 × 10$^{-6}$ |
| Example 14 | 15 | 0.09 | logL = 0.89 · logI + 425 × 10$^{-6}$ |
| Example 15 | 7 | 0.04 | logL = 1.01 · logI + 1091 × 10$^{-6}$ |

Furthermore, the spectrum distributions of pyrimidopyrimidine derivatives used in examples 11-15 were measured in dioxane solution 10$^{-4}$M by a photometer. Table 4 shows the results and its head line indicating peak wavelength and luminous intensity.

TABLE 4

| EL device | Peak wavelength (nm) | Luminous intensity (eV) |
|---|---|---|
| Example 11 | 470 | 4055 |
| Example 12 | 473 | 3586 |
| Example 13 | 482 | 3559 |
| Example 14 | 479 | 3644 |
| Example 15 | 461 | 4079 |

EXAMPLES 16-24

EL device having the emitting layer made of only Tetradiphenylamino pyrimidopyrimidine derivative For a further preferred Example of EL device, 2,4,6,8-Tetradiphenylamino pyrimido[5,4-d]pyrimidine denoted by the following formula 45 was synthesized.

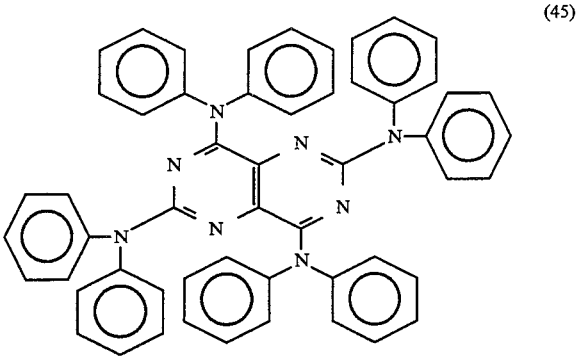

(45)

Examples 16-24 of EL devices were assembled each having functional layers of the orders of laminating layers with thicknesses as shown in Table 5 under the same conditions as Example 1, except that the cathodes were made of Mg and Ag with 10:1 in volume ratio.

TABLE 5

| No. | Hole transport layer (Å) | Emitting layer (Å) | Electron transport layer (Å) | Cathode layer (Å) |
|---|---|---|---|---|
| 16 | TPD(500) | /TPB(150) | /TDPHPYPY (372) | /MGAG (900) |
| 17 | TPD(500) | /TDPHPYPY (265) | — | /MGAG (883) |
| 18 | TDPHPYPY (372) | /TPD(300) | /ALQ(500) | /MGAG (885) |
| 19 | TPD(300) | /TDPHPYPY (186) | /ALQ(200) | /MGAG (1000) |
| 20 | TPD(300) | /TDPHPYPY (186) | /ALQ(500) | /MGAG (950) |
| 21 | TDPHPYPY (124) | /TPD(300) | /ALQ(500) | /MGAG (882) |
| 22 | TPD(500) | /TDPHPYPY (188) | /ALQ(500) | /MGAG (882) |
| 23 | TPD(500) | /TDPHPYPY (434) | — | /MGAG (868) |
| 24 | TDPHPYPY (434) | /t-Bu-PBD(500) | — | /MGAG (900) |

TPD = Tetraphenyldiamine, TPB = Tetraphenylbutadiene MGAG = Mg—Ag alloy, ALQ = Al$_{q3}$ = Aluminum quinoline TDPHPYPY = 2,4,6,8-Tetradiphenylamino pyrimido[5,4-d]pyrimidine, ( ) = Film thickness The EL devices were measured with respect to the emission characteristics. Table 6 shows emission properties of the resultant EL devices.

TABLE 6

| device No. | Emission* efficiency (lm/W) | Emission* efficiency (cd/A) | Current (A/4 mm$^2$) | Voltage (V) | Peak wavelength (nm) | Quantum yield |
|---|---|---|---|---|---|---|
| 16 | — | — | — | — | 460 | |
| 17 | — | — | — | — | 550 | |
| 18 | 1.14 | 4.29 | 2.8 × 10$^{-4}$ | 11.33 | 550 | |
| 19 | 0.57 | 0.98 | 1.2 × 10$^{-3}$ | 5.45 | 550 | |
| 20 | 1.73 | 2.79 | 4.3 × 10$^{-4}$ | 5.03 | 550 | |
| 21 | 1.69 | 4.17 | 2.4 × 10$^{-4}$ | 7.73 | 520 | |
| 22 | 2.38 | 5.57 | 2.2 × 10$^{-4}$ | 7.36 | 555 | 1.69 |
| 23 | — | — | — | — | 545 | |
| 24 | 0.78 | 1.54 | 7.8 × 10$^{-4}$ | 6.17 | 550 | |

*Emission efficiency at L = 300(nit:cd/m$^2$)

TABLE 6 bis

| device No. | Emission* efficiency (lm/W) | Mean luminance (nit) | Voltage (V) | Maximum luminance (nit) | CIE X | CIE Y |
|---|---|---|---|---|---|---|
| 16 | — | 7.4 | 9.92 | — | 0.19 | 0.28 |
| 17 | — | — | 6.61 | — | 0.40 | 0.59 |
| 18 | 1.03 | 1149 | 13.56 | 15740 | 0.39 | 0.54 |
| 19 | — | 223 | 5.10 | 4490** | 0.42 | 0.56 |
| 20 | 1.62 | 819 | 6.13 | 16410** | 0.41 | 0.56 |
| 21 | 1.38 | 1060 | 9.28 | 26100** | 0.30 | 0.56 |
| 22 | 1.81 | 1321 | 8.74 | 22400** | 0.43 | 0.54 |
| 22 | | 1425 | 8.76 | | | |
| 23 | — | — | — | 155** | 0.42 | 0.57 |
| 24 | — | 235 | 6.90 | 1605 | 0.43 | 0.56 |

*Emission efficiency at I = $10^{-3}$(A/4 mm$^2$)
**Maximum luminance at I = 30 mA/4 mm$^2$ Since the EL spectrum distributions of light emitted from the EL devices had peaks of wavelength about 550 nm which were PL spectrum peaks of TDPHPYPY per se excepting devices of Nos. 16 and 21, it was understood that the re-combination of electron and positive-hole occurs in TDPHPYPY film layer notwithstanding the order of film-formation.

In comparison with the current-voltage characteristics of the EL devices Nos. 23 and 24, device No. 23 has the current flow easier than that of No. 24. In the current-luminance characteristics, device No. 24 has the emission larger than that of No. 23. From this result, it is understood that the TDPHPYPY thin film has a capability of transporting positive-holes. pyrimidopyrimidine derivatives are not only have the capability of transporting electrons but also the capability of transporting positive-holes. Therefore every current-voltage characteristic of the EL devices of examples is very high.

When current I=242.9 (micro amperes/4 mm$^2$) was applied to device No. 22, its luminance L=264(nit) and voltage V=7.29(V) were obtained. In the case that this current conditions was kept constant and left for 63 hours, the luminance of the EL device was measured again to emit at luminance L=190(nit).

Although a comparative two-layer type EL device of TPD(500 Å)/ALQ(500 Å)/MGAG(1000 Å), which is well known as a high luminous EL device, gave the luminance 300(nit) and emission efficiency 1.99(1m/W) as large values, the present preferred embodiment of No. 22 had the luminance 2.38(1/W) higher than that of such a comparative.

What is claimed is:

1. An organic electroluminescence device comprising an anode, a positive-hole transport layer of organic compound, an emitting layer of organic compound, and a cathode which are laminated in sequence, wherein said emitting layer comprises a pyrimidopyrimidine derivative represented by formula 1

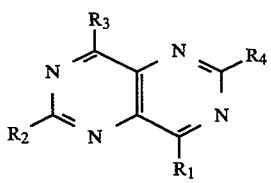

where $R_1$-$R_4$ are independently hydrogen atom, halogen atom and functional groups represented by formula 2

where $R_5$ and $R_6$ are independently hydrogen atom, alkyl group, aryl group, or $R_5$ and $R_6$ taken together comprises the atoms or groups necessary to complete a cycloalkyl or heterocyclic ring.

2. An organic electroluminescence device according to claim 1, wherein said pyrimidopyrimidine derivative is represented by formula 3

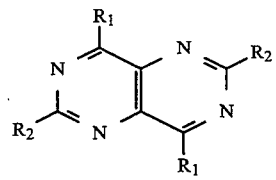

where $R_1$ and $R_2$ are different from each other and independently hydrogen atom, halogen atom, or the functional groups represented by said formula 2.

3. An organic electroluminescence device according to claim 1, wherein said pyrimidopyrimidine derivative is represented by formula 4

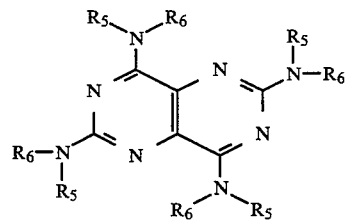

wherein $R_5$ and $R_6$ are independently hydrogen atom, alkyl group, aryl group, or $R_5$ and $R_6$ taken together comprises the atoms or groups necessary to complete a cycloalkyl or heterocyclic ring.

4. An organic electroluminescence device according to claim 1, wherein the hetero atoms in said heterocyclic ring are selected from nitrogen, oxygen and sulfur.

5. An organic electroluminescence device according to claim 1, wherein, when $R_5$ and $R_6$ are taken together to form a cycloalkyl or heterocyclic ring, the portions of alkyl group, alkylene group, aryl group and arylene group in said cycloalkyl or heterocyclic ring constructed by $R_5$ and $R_6$ taken together, are substituted by substituent groups selected from the group consisting of alkyl groups, alkoxy groups, aryl groups, aryloxy groups and halogen atoms.

6. An organic electroluminescence device according to claim 1, further comprising an organic electron transport layer arranged between said emitting layer and said cathode.

7. An organic electroluminescence device comprising an anode, a positive-hole transport layer of organic compound, an emitting layer of organic compound, and a cathode which are laminated in sequence, wherein said emitting layer comprises a mixture of a pyrimidopyrimidine derivative as a fluorescent guest material and an organic host material having a large capability of transporting electrons, said pyrimidopyrimidine derivative being represented by formula 1

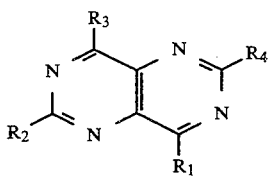

(1)

where $R_1$–$R_4$ are independently a hydrogen atom, a halogen atom or a functional group represented by formula (2)

(2)

where $R_5$ and $R_6$ are independently a hydrogen atom, an alkyl group, an aryl group, or $R_5$ and $R_6$ taken together comprise the atoms or groups necessary to complete a cycloalkyl or heterocyclic ring;

said organic host material comprising a compound selected from the group consisting of 2-(4'-tert-Butylphenyl)-5-(biphenyl)-1,3,4-oxadiazole, tris(8-quinolinol) aluminum, bis(8-quinolinol) magnesium, bis(benzo{f}-8-quinolinol) zinc, bis(2-methyl-8-quinolinolate) aluminum oxide, tris(8-quinolinol) indium, tris(5-methyl-8-quinolinol)aluminum, 8-quinolinol lithium, tris(5-chloro-8-quinolinol) gallium, bis(5-chloro-8-quinolinol) calcium and poly[-zinc(II)-bis(8-hydroxy-5-guinolinyl)methane.

8. An organic electroluminescence device according to claim 7, wherein said pyrimidopyrimidine derivative is represented by formula (3)

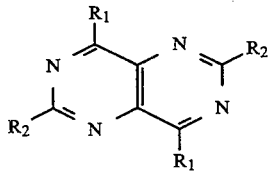

(3)

where $R_1$ and $R_2$ are different from each other and independently represent a hydrogen atom, a halogen atom, or a functional group represented by formula (2)

(2)

where $R_5$ and $R_6$ are independently a hydrogen atom, an alkyl group, an aryl group, or $R_5$ and $R_6$ taken together comprise the atoms or groups necessary to complete a cycloalkyl or heterocyclic ring.

9. An organic electroluminescence device according to claim 7, wherein said pyrimidopyrimidine derivative is a compound represented by formula (4):

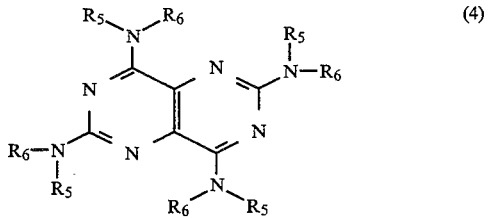

(4)

where $R_5$ and $R_6$ independently represent a hydrogen atom, an alkyl group, an aryl group, or $R_5$ and $R_6$ taken together comprise the atoms or groups necessary to complete a cycloalkyl or heterocyclic ring.

10. An organic electroluminescence device according to claim 7, wherein the hetero atoms in said heterocyclic ring are selected from the group consisting of nitrogen, oxygen and sulfur.

11. An organic electroluminescence device according to claim 7, wherein, when $R_5$ and $R_6$ are taken together to form a cycloalkyl or heterocyclic ring, the portions of alkyl group, alkylene group, aryl group and arylene group in said cycloalkyl or heterocyclic ring constructed by $R_5$ and $R_6$ taken together, are substituted by substituent groups selected from the group consisting of alkyl groups, alkoxy groups, aryl groups, aryloxy groups and halogen atoms.

12. An organic electroluminescence device according to claim 11, wherein said substituent is a halogen atom selected from the group consisting of fluorine, chlorine and bromine.

13. An organic electroluminescence device according to claim 7, further comprising an organic electron transport layer arranged between said emitting layer and said cathode.

14. An organic electroluminescence device according to claim 5, wherein said substituent is a halogen atom selected from the group consisting of fluorine, chlorine and bromine.

15. An organic electroluminescence device according to claim 1, wherein said pyrimidopyrimidine derivative represented by formula (1) is selected from the group consisting of 2,6-bis(diethanolamino)-4, 8-dipiperidino pyrimido[5,4-d]pyrimidine, 2,4,8- tri(p-methoxyanilino) pyrimido[5,4-d]pyrimidine, 2,4,6,8-tetramorpholino pyrimido[5,4-d]pyrimidine, 2,4,6,8-tetraanilino pyrimido[5,4-d]pyrimidine, 2,4,6,8,-tetra(p-methoxyanilino) pyrimido[5,4-d]pyrimidine, 2,4,6,8-tetrabenzylamino pyrimido[5,4-d]pyrimidine, 2,4,8-trimorpholine pyrimido[5,4-d]pyrimidine, 2,4,8-tripyrrolidino pyrimido[5,4-d]pyrimidine, 2,4,6,8-tetrapiperidino pyrimido[5,4-d]pyrimidine, 2,4,6,8tetradiphenylaminopyrimido[5,4-d]pyrimidine and2,4,6,8-tetrathiomorpholinopyrimido[5,4d]pyrimidine.

16. An organic electroluminescence device according to claim 7, wherein said pyrimidopyrimidine derivative represented by formula (1) is selected from the group consisting of 2,6-bis(diethanolamino)-4,8-dipiperidinopyrimido[5,4-d]pyrimidine,2,4,8-tri(p-methoxyanilino) pyrimido[5,4-d]pyrimidine, 2,4,6,8-tetramorpholino pyrimido[5,4-d]pyrimidine, 2,4,6,8-tetraanilino pyrimido[5,4-d]pyrimidine, 2,4,6,8,-tetra(p-methoxyanilino) pyrimido[5,4-d]pyrimidine, 2,4,6,8-tetrabenzylamino pyrimido[5,4-d]pyrimidine, 2,4,8-trimorpholine pyrimido[5,4-d]pyrimidine, 2,4,8-tripyrrolidino pyrimido[5,4-d]pyrimidine, 2,4,6,8-tetrapiperidino pyrimido[5,4-d]pyrimidine, 2,4,6,8-tetradiphenylaminopyrimido[5,4-d]pyrimidineand2,4,6,8-tetrathiomorpholinopyrimido[5,4-d]pyrimidine.

17. An organic electroluminescence device according to claim 15, wherein said pyrimidopyrimidine derivative represented by formula (1) is 2,4,6,8-tetradiphenylamino pyrimido[5,4-d]pyrimidine.

18. An organic electroluminescence device according to claim 16, wherein said pyrimidopyrimidine derivative represented by formula (1) is 2,4,6,8-tetradiphenylamino pyrimido[5,4-d]pyrimidine.

* * * * *